United States Patent
Ferrel

(10) Patent No.: US 9,150,107 B2
(45) Date of Patent: Oct. 6, 2015

(54) AUTOMOTIVE VEHICLE POWER SYSTEM INTERLOCK DETECTION

(75) Inventor: Mark J. Ferrel, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 863 days.

(21) Appl. No.: 13/284,430

(22) Filed: Oct. 28, 2011

(65) Prior Publication Data

US 2013/0106171 A1    May 2, 2013

(51) Int. Cl.
*B60L 3/00* (2006.01)
*B60L 3/04* (2006.01)

(52) U.S. Cl.
CPC .............. *B60L 3/0061* (2013.01); *B60L 3/04* (2013.01); *B60L 2240/547* (2013.01)

(58) Field of Classification Search
CPC ....................................................... B60L 3/04
See application file for complete search history.

(56) References Cited

U.S. PATENT DOCUMENTS

| | | |
|---|---|---|
| 7,402,068 B1 | 7/2008 | Tarchinski |
| 7,426,099 B2 | 9/2008 | Soudier et al. |
| 7,586,722 B2 | 9/2009 | Scholer et al. |
| 7,641,499 B1 | 1/2010 | George et al. |
| 2010/0084205 A1 | 4/2010 | Tarchinski et al. |

OTHER PUBLICATIONS

CDX Online eTEXTBOOK, Service Hybrid Electric Vehicles—Safely!, ASE Fuel Technology Articles, Oct. 25, 2002, 5 pgs., http://www.cdxetextbook.com/asearticles/servicehybelecvehicle.html.

*Primary Examiner* — Rexford Barnie
*Assistant Examiner* — Toan Vu
(74) *Attorney, Agent, or Firm* — David B. Kelley; Brooks Kushman P.C.

(57) ABSTRACT

A vehicle power system may include a signal driver system electrically connected with a signal receiver system, and a traction battery electrically connected with contactors responsive to the signal receiver system. The electrical connections may be routed through a common interface. A voltage associated with a control signal commanding the signal receiver system to cause the contactors to close and driven into the electrical connection between the signal driver and signal receiver systems by the signal driver system may indicate whether the electrical connection between the traction battery and contactors at the common interface is faulty.

15 Claims, 4 Drawing Sheets

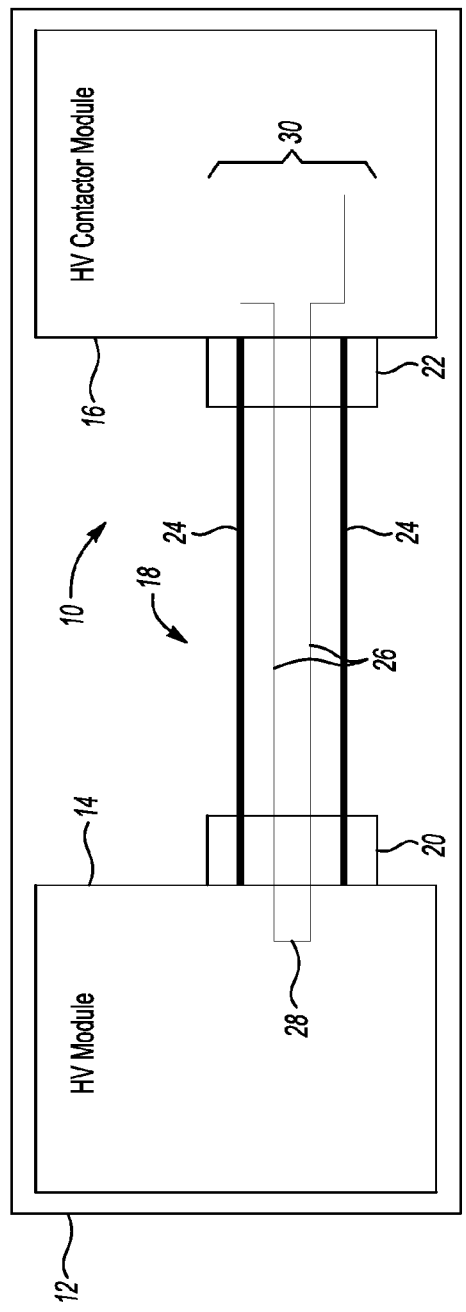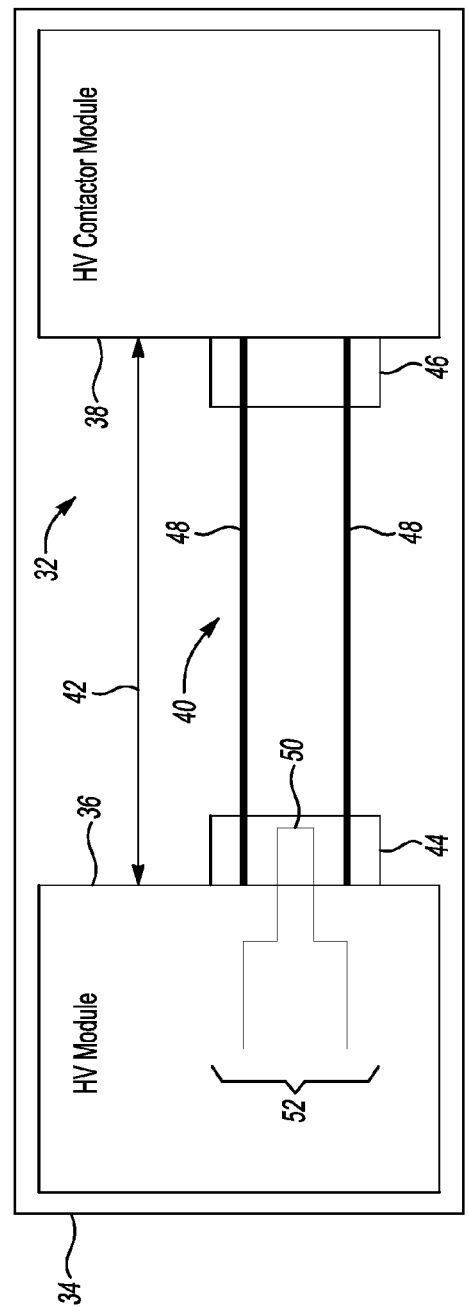

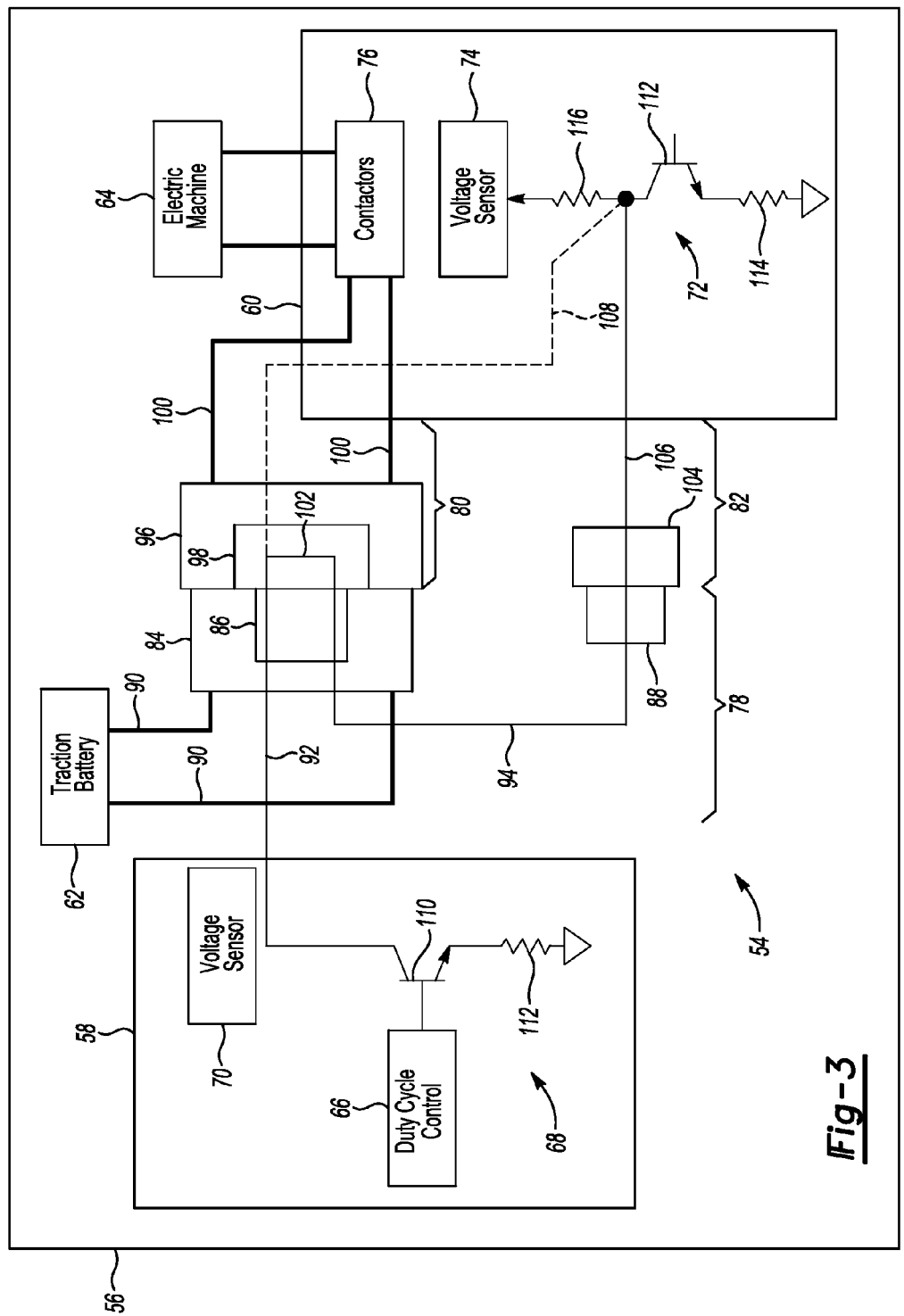

AUTOMOTIVE VEHICLE POWER SYSTEM INTERLOCK DETECTION

TECHNICAL FIELD

This disclosure relates to interlock detection of automotive power system connectors.

BACKGROUND

An electrified vehicle often includes a power storage unit, such as a traction battery, arranged to provide power for moving the vehicle. Power modules and wiring harnesses may form portions of the electrical path between the traction battery and the various high-voltage electrical loads electrically connected with the traction battery. The power modules and wiring harnesses may include connectors that interface with other components disposed along the electrical path. These connectors, on occasion, may not have a complete connection with their mating components.

SUMMARY

The electrical connections between primary and secondary controllers, and a traction battery and switch associated with the secondary controller may be routed through a common interface. A voltage associated with a control signal driven into the electrical connection between the primary and secondary controllers may indicate whether the electrical connection between the traction battery and switch at the interface is faulty.

A vehicle may include a traction battery, a primary controller, a secondary controller including a switch, and a wiring harness arrangement. The wiring harness arrangement may define at least a portion of a first electrical path connecting the traction battery and switch, and a second electrical path connecting the primary and secondary controllers. The wiring harness arrangement may include an electrical connector assembly through which the first and second electrical paths are routed. The primary controller may generate a control signal commanding the secondary controller to close the switch. The secondary controller may close the switch in response to the control signal if a voltage associated with the control signal falls within a predetermined range of voltages indicative of a non-faulty electrical connection between the primary and secondary controllers at the electrical connector assembly.

A vehicle power system may be controlled by generating, by a signal driver system, a control signal, for a signal receiver system, commanding the signal receiver system to close contactors to enable current flow between a traction battery and an electric machine, and closing the contactors if a voltage associated with the control signal falls within a predetermined range of voltages indicative of a non-faulty electrical connection between the signal driver and receiver systems.

An assembly for a vehicle may include a traction battery, a primary controller including a signal driver system, and a secondary controller including a signal receiver system and contactors responsive to the signal receiver system. The assembly may further include an interface electrically connecting the traction battery with the contactors, and the signal driver system with the signal receiver system. The signal driver system may generate a control signal commanding the signal receiver system to cause the contactors to close. The signal receiver system may cause the contactors to close in response to the control signal if a voltage associated with the control signal falls within a predetermined range of voltages.

BRIEF DESCRIPTION OF THE DRAWINGS

FIGS. 1-3 are block diagrams of automotive power systems.

DETAILED DESCRIPTION

Figure 4:
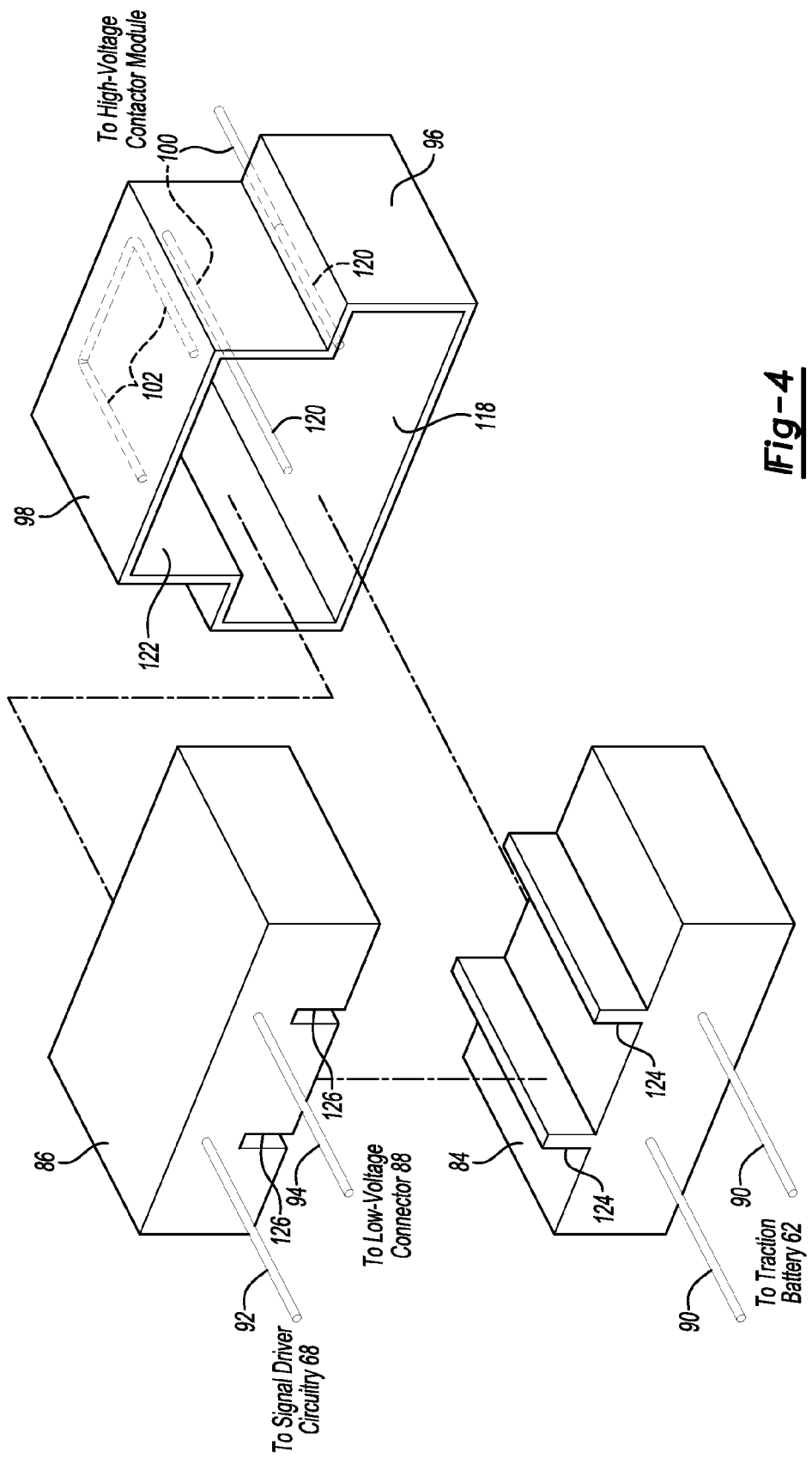
FIG. 4 is an exploded assembly view of one of the connectors of FIG. 3.

Embodiments of the present disclosure are described herein; however, it is to be understood that the disclosed embodiments are merely examples and other embodiments may take various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, may be desired for particular applications or implementations.

Referring to FIG. 1, a power system 10 for an automotive vehicle 12 includes a high-voltage module 14, a high-voltage contactor module 16, and a high-voltage wiring harness 18 electrically connected there between. The high-voltage module 14 is electrically connected with a traction battery (not shown) and distributes electric current received from the traction battery to the high-voltage contactor module 16 via the high-voltage wiring harness 18. The high-voltage contactor module 16 distributes electric current received from the high-voltage module 14 to various high-voltage electrical loads, such as an electric machine (not shown), electrically connected therewith.

The high-voltage wiring harness 18 includes connectors 20, 22, high-voltage wiring 24, and low-voltage wiring 26. The connectors 20, 22 respectively electrically interface with the high-voltage module 14 and high-voltage contactor module 16. The high-voltage wiring 24 electrically connects the connectors 20, 22 and forms a high-voltage circuit that carries high-voltage electric current between the modules 14, 16. The low-voltage wiring 26 also electrically connects the connectors 20, 22 and completes an interlock detection circuit, which includes a loop back portion 28 within the high-voltage module 14 and a terminal portion 30 within the high-voltage contactor module 16, when the connectors 20, 22 are properly respectively connected with the modules 14, 16.

The high-voltage contactor module 16 includes a sensor (not shown) configured to detect a voltage across the terminal portion 30 and contactors (not shown) that electrically connect the high-voltage circuit and various high-voltage electrical loads (not shown). The contactors are opened/closed based on the detected voltage. That is, the quality of the connections between the connectors 20, 22 and their respective modules 14, 16 may be determined based on the voltage across the terminal portion 30. The contactors are closed (the connections are assumed to be proper) if the detected voltage falls within some expected range indicative of a complete interlock detection circuit. The contactors are opened (the connections are assumed to be improper) if the detected voltage falls outside of the expected range. If the contactors are closed, high-voltage electric current from the high-voltage module 14 may flow to the various high-voltage electrical loads (not shown) mentioned above. If the contactors are open, high-voltage electric current may not so flow.

Referring to FIG. 2, a power system 32 for an automotive vehicle 34 includes a high-voltage module 36, a high-voltage contactor module 38, and a high-voltage wiring harness 40 and communications line 42 each electrically connected between the modules 36, 38. The high-voltage module 36 is operatively arranged with a traction battery (not shown) in a manner similar to that described with reference to the high-voltage module 14 of FIG. 1. Likewise, the high-voltage contactor module 38 is operatively arranged with various high-voltage electrical loads (not shown) in a manner similar to that described with reference to the high-voltage contactor module 16 of FIG. 1.

The high-voltage wiring harness 40 includes connectors 44, 46 and high-voltage wiring 48. The connectors 44, 46 respectively electrically interface with the high-voltage module 36 and high-voltage contactor module 38. The high-voltage wiring 48 electrically connects the connectors 44, 46 and forms a high-voltage circuit that carries high-voltage electric current between the modules 36, 38. The connector 44 includes a loop back portion 50 and the high-voltage module 36 includes a terminal portion 52 that together form an interlock detection circuit when the connector 44 is properly connected with the module 36.

The high-voltage module 36 includes a sensor (not shown) configured to detect a voltage across the terminal portion 52 and a communications interface (not shown) operatively arranged with the sensor and communications line 42. The high-voltage contactor module 38 includes contactors (not shown) that electrically connect the high-voltage circuit and various high-voltage electrical loads (not shown), and a control interface (not shown) operatively arranged with the contactors and communications line 42.

The contactors are opened/closed based on the detected voltage. That is, the quality of the connection between the connector 44 and the module 36 may be determined based on the voltage across the terminal portion 52. If the detected voltage falls within some expected range indicative of a complete interlock detection circuit, the communications interface sends a command to the high-voltage contactor module 38 to close the contactors. If the detected voltage falls outside of the expected range, the communications interface does not send such a command (and/or sends a command to the high-voltage contactor module 38 to open the contactors). The control interface of the high-voltage contactor module 38 opens or closes the contactors in response to the command. In other examples, the high-voltage contactor module 38 may detect its own continuity in a manner similar to the high-voltage module 36.

Referring to FIG. 3, a power system 54 for an automotive vehicle 56 may include a controller 58, a high-voltage contactor module 60, a traction battery 62, and an electric machine 64. The electric machine 64, in the example of FIG. 3, is arranged to transform electrical energy from the traction battery 62 to mechanical energy to move the vehicle 56. The controller 58 may include duty cycle control logic 66, signal driver circuitry 68, and a voltage sensor 70 arranged to detect a voltage associated with the signal driver circuitry 68. The high-voltage contactor module 60 may include signal receiver circuitry 72, a voltage sensor 74 arranged to detect a voltage associated with the signal receiver circuitry 72, and contactors 76 (or any other suitable/known switch). The arrangement and operation of these components are described in further detail below.

The power system 54 may further include wiring harnesses 78, 80, 82. The wiring harness 78, in this example, includes a high-voltage connector 84 and low-voltage connectors 86, 88. It also includes high-voltage wiring 90 electrically connecting the traction battery 62 and high-voltage connector 84, low-voltage wiring segment 92 electrically connecting the signal driver circuitry 68 and the low-voltage connector 86, and low-voltage wiring segment 94 electrically connecting the low-voltage connectors 86, 88. In other examples, the wiring harness 78 may instead comprise two separate wiring harnesses: a high-voltage harness including the high-voltage connector 84 and high-voltage wiring 90, and a low-voltage harness including the low-voltage connectors 86, 88 and the low-voltage wiring segments 92, 94. The wiring harness 80, in this example, includes a high-voltage connector 96 and a low-voltage connector 98. It also includes high-voltage wiring 100 electrically connecting the high-voltage connector 96 and contactors 76. The low-voltage connector 98 includes a loop back portion 102 electrically connecting the low-voltage wiring segments 92, 94. The wiring harness 82, in this example, includes a low-voltage connector 104 and low-voltage wiring segment 106 electrically connecting the low-voltage connector 104 and the signal receiver circuitry 72.

The high-voltage wiring 90, 100 form a high-voltage circuit, if the high-voltage connectors 84, 96 are properly connected to each other, that carries high-voltage electric current between the traction battery 62 and the contactors 76. If the contactors 76 are closed, high-voltage electric current from the traction battery 62 may flow to the electric machine 64. If the contactors 76 are open, such current may not flow. Closing the contactors 76 if the high-voltage connectors 84, 96 are improperly connected with each other (or not connected at all) may be undesirable. The high-voltage contactor module 60 determines whether to close the contactors 76 based on information from the voltage sensor 74 as described in more detail below.

The low-voltage wiring segments 92, 102, 94, 106 form a low-voltage circuit that carries a low-voltage communication signal between the signal driver circuitry 68 and the signal receiver circuitry 72 if (1) the high-voltage connectors 84, 96 are properly connected to each other, (2) the low-voltage connectors 86, 98 are properly connected to each other, and (3) the low-voltage connectors 88, 104 are properly connected to each other. That is, a voltage associated with the communication signal (originating from the duty cycle control 66) will fall within some expected range if the connections described above are proper; the voltage will fall outside of the expected range if the connections are improper or faulty. Hence, the voltage detected by the voltage sensor 74 (or possibly 70) may be used to determine the quality of the connection between the high-voltage connectors 84, 96 (as well as the quality of the connections between the low-voltage connectors 86, 98 and 88, 104).

In other examples, the low-voltage wiring segments 94, 106, loop back portion 102, and low-voltage connectors 88, 104 may be omitted. A low-voltage wiring segment 108 may instead electrically connect the low-voltage connector 98 and the signal receiver circuitry 72. This arrangement may present isolation issues if the low-voltage wiring segment 108 is routed between the connectors 96, 98 and contactors 76 in close proximity to the high-voltage wiring 100. Any suitable/known circuit isolation technology, however, may be used to ensure isolation between the wiring 100 and wiring segment 108. The arrangement described in previous paragraphs may not present such isolation issues as the low-voltage wiring segments 94, 106, loop back portion 102, and low-voltage connectors 88, 104 allow the low-voltage circuitry formed thereby to be routed some distance away from the high-voltage wiring 100. Other arrangements, of course, are also contemplated.

The duty cycle control logic 66 may cause the signal driver circuitry 68, which in this example includes a transistor 110 connected with the low-voltage wiring segment 92 and a resistive element 112 connected to the transistor 110 and chassis ground, to drive a signal carrying command and/or communication information for the high-voltage contactor module 60 on to the low voltage circuit formed by the low-voltage wiring segments 92, 102, 94, 106. The signal receiver circuitry 72, which in this example includes a transistor 112 connected with the low-voltage wiring segment 106, a resistive element 114 connected to the transistor 112 and chassis ground, and a resistive element 116 connected to the low-voltage wiring segment 106 and operatively arranged with the voltage sensor 74, may receive the signal carrying command and/or communication information. If the voltage sensor 74 detects a voltage, for example, in the 1 V to 12 V range associated with the received signal, the high-voltage contactor module 60 may close the contactors 76. Otherwise, the high-voltage contactor module 60 may not close the contactors 76.

Referring to FIG. 4, the high-voltage connector 96 may define a cavity 118 and include male terminal portions 120 that reside within the cavity 118 and that are electrically connected with the high-voltage wiring 100. The low-voltage connector 98 may define a cavity 122 and include male terminal portions (associated with the loop back portion 102) that reside within the cavity 122.

The high-voltage connector 84 may include tracks 124 extending away from a surface intended to be adjacent to the low-voltage connector 86 when assembled. The high-voltage connector 84 may further include female terminal portions (not shown) that receive the male terminal portions 120 and that are electrically connected with the high-voltage wiring 90. The low-voltage connector 86 may include recessed portions 126 formed in a surface intended to be adjacent to the high-voltage connector 84 and that receive the tracks 124 when assembled. The low-voltage connector 86 may further include female terminal portions (not shown) that receive the mail terminal portions associated with the loop back portion 102 and that are electrically connected with the low-voltage wiring segments 92, 94.

The high-voltage connector 84 may first be inserted into the cavity 118 to electrically connect the high-voltage wiring 90, 100. The low-voltage connector 86 may then be inserted into the cavity 122 along the tracks 124 (thus engaging the high-voltage connector 84) to electrically connect the low-voltage wiring segments 92, 94 via the loop back portion 102. In this embodiment, the high-voltage connector 84 supports the low-voltage connector 86. That is, the connectors 84, 86 are arranged in a known fashion such that if an attempt is made to connect the low-voltage connector 86 before the high-voltage connector 84, the low-voltage connector 86 would likely fall out of the cavity 122. For example, the high-voltage connector 84 may include a tab portion (not shown) arranged in a known fashion that holds the low-voltage connector 86 in place. If the low-voltage connector 86 does not engage the tab portion because, for example, the high-voltage connector 84 is not disposed within the cavity 118, the low-voltage connector 86 is free to fall out of the cavity 122. To remove the low-voltage connector 86 from the cavity 122 (if properly installed), the tab portion would need to be disengaged. Other suitable/known connecting/locking technology may also be used.

Figure 5:
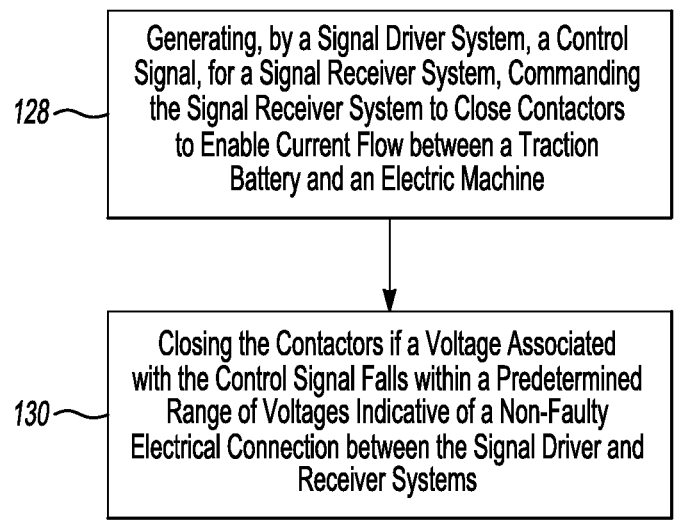
FIG. 5 is a flow chart of an algorithm for controlling a vehicle power system.

Referring to FIG. 5, a signal driver system generates a control signal commanding a signal receiver system to close contactors to enable current flow between a traction battery and an electric machine at operation 128. At operation 130, the contactors are closed if a voltage associated with the control signal falls within a predetermined range of voltages indicative of a non-faulty electrical connection between the signal driver and receiver systems.

While exemplary embodiments are described above, it is not intended that these embodiments describe all possible forms encompassed by the claims. The words used in the specification are words of description rather than limitation, and it is understood that various changes may be made without departing from the spirit and scope of the disclosure and claims. As previously described, the features of various embodiments may be combined to form further embodiments of the invention that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to: cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
a traction battery;
a primary controller;
a secondary controller including a switch; and
a wiring harness arrangement defining at least a portion of (i) a first electrical path connecting the traction battery and switch and (ii) a second electrical path connecting the primary and secondary controllers, the wiring harness arrangement including an electrical connector assembly through which the first and second electrical paths are routed, the primary controller configured to generate a control signal commanding the secondary controller to close the switch, and the secondary controller configured to close the switch in response to the control signal if a voltage associated with the control signal falls within a predetermined range of voltages indicative of a non-faulty electrical connection between the primary and secondary controllers at the electrical connector assembly.

2. The vehicle of claim 1 wherein the electrical connector assembly includes a primary-side signal connector and a primary-side power connector engaged with the primary-side signal connector, wherein the first electrical path passes through the primary-side signal connector, and wherein the second electrical path passes through the primary-side power connector.

3. The vehicle of claim 2, wherein the electrical connector assembly further includes a secondary-side connector engaged with the primary-side signal and power connectors, and wherein the first electrical path is routed through the electrical connector assembly such that electric current associated with the control signal enters the electrical connector assembly via the primary-side signal connector, loops through the secondary-side connector, and exits the electrical connector assembly via the primary-side signal connector to isolate the first electrical path from the second electrical path.

4. The vehicle of claim 3 further comprising another electrical connector assembly disposed in the first electrical path between the primary-side signal connector and secondary controller.

5. The vehicle of claim 1 wherein the predetermined range of voltages is 1 to 12 volts.

6. The vehicle of claim 1 further comprising an electric machine configured to transform electrical energy from the traction battery to mechanical energy to move the vehicle, wherein the switch is electrically connected with the electric machine.

7. A method for controlling a vehicle power system comprising:
generating, by a signal driver system, a control signal commanding a signal receiver system to close contactors to enable current flow between a traction battery and an electric machine; and
closing, by the signal receiver system, the contactors if a voltage associated with the control signal falls within a predetermined range of voltages indicative of a non-faulty electrical connection between the signal driver and receiver systems.

8. The method of claim 7 wherein the predetermined range of voltages is 1 to 12 volts.

9. An assembly for a vehicle comprising:
a traction battery;
a primary controller including a signal driver system;
a secondary controller including a signal receiver system and contactors responsive to the signal receiver system; and
an interface electrically connecting (i) the traction battery with the contactors and (ii) the signal driver system with the signal receiver system, the signal driver system configured to generate a control signal commanding the signal receiver system to cause the contactors to close, and the signal receiver system configured to cause the contactors to close in response to the control signal if a voltage associated with the control signal falls within a predetermined range of voltages.

10. The assembly of claim 9 wherein the predetermined range of voltages is indicative of a non-faulty electrical connection between the signal driver and signal receiver systems at the interface.

11. The assembly of claim 9 wherein the interface includes a primary-side signal connector and a primary-side power connector engaged with the primary-side signal connector, wherein current flows between the signal driver and signal receiver systems via the primary-side signal connector, and wherein current flows between the traction battery and contactors via the primary-side power connector.

12. The assembly of claim 11, wherein the interface further includes a secondary-side connector engaged with the primary-side signal and power connectors, further comprising an electrical path defining the electrical connection between the signal driver and signal receiver systems and routed through the primary-side signal connector and secondary-side connector such that electric current associated with the control signal enters the interface via the primary-side signal connector and exits the interface via the primary-side signal connector.

13. The assembly of claim 12 further comprising another interface disposed in the electrical path between the primary-side signal connector and signal receiver system.

14. The assembly of claim 9 wherein the predetermined range of voltages is 1 to 12 volts.

15. The assembly of claim 9 further comprising an electric machine configured to transform electrical energy from the traction battery to mechanical energy to move the vehicle, wherein the contactors are electrically connected with the electric machine.

* * * * *